(12) United States Patent
Murphy et al.

(10) Patent No.: US 6,354,496 B1
(45) Date of Patent: Mar. 12, 2002

(54) METHOD FOR SELF SERVICE CHECKOUT

(75) Inventors: Patrick R. Murphy, Irvine, CA (US); Thomas K. Roslak, Eastport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/299,228

(22) Filed: Apr. 23, 1999

(51) Int. Cl.⁷ .............................................. G06K 15/00
(52) U.S. Cl. ....................... 235/383; 235/380; 235/381; 235/385
(58) Field of Search .................... 235/383, 462.14, 235/470, 485, 380, 381, 385, 472.02, 375; 186/61; 702/128, 129, 173, 175; 705/16, 23

(56) References Cited

U.S. PATENT DOCUMENTS

| | | | | |
|---|---|---|---|---|
| 4,676,343 A | * | 6/1987 | Humble et al. | 235/383 |
| 4,779,706 A | * | 10/1988 | Mergenthaler | 235/383 |
| 4,909,356 A | * | 3/1990 | Rimondi et al. | 235/383 |
| 5,013,896 A | * | 5/1991 | Ono et al. | 235/383 |
| 5,115,888 A | * | 5/1992 | Schneider | 235/383 |
| 5,375,680 A | * | 12/1994 | Ikeda et al. | 235/383 |
| 5,397,882 A | * | 3/1995 | Van Solt | 235/381 |
| 5,426,282 A | * | 6/1995 | Humble | 235/383 |
| 5,468,942 A | | 11/1995 | Oosterveen et al. | 253/383 |
| 5,494,136 A | * | 2/1996 | Humble | 235/383 |
| 5,747,784 A | * | 5/1998 | Walter et al. | 235/383 |
| 5,877,485 A | * | 3/1999 | Swartz | 235/383 |
| 5,900,614 A | * | 5/1999 | Nakakawaji et al. | 235/462.14 |
| 5,923,735 A | * | 7/1999 | Swartz et al. | 235/472 |
| 5,967,264 A | * | 10/1999 | Lutz et al. | 235/383 |
| 5,979,753 A | * | 11/1999 | Roslak | 235/380 |
| 6,189,789 B1 | * | 2/2001 | Levine et al. | 235/383 |

* cited by examiner

*Primary Examiner*—Michael G. Lee
*Assistant Examiner*—Uyen-Chau N. Le

(57) ABSTRACT

A computer-assisted shopping system includes a self-service scanning station, a multiplexing tendering station, and associated methods of serving customers at a retail establishment. One of the methods of customer service of the present invention allows a shopping establishment to offer a self-scanning shopping option to customers who are unable or unwilling to obtain a personal identification card, which is required with the prior art self-scanning shopping systems. A self-service scanning station is provided that includes a bar-code scanner, preferably permanently mounted or tethered to the self-service scanning station, a processor, optionally connected by a network to a central computer of the shopping establishment, and a printer for printing itemized receipts of items to be purchased. A customer who does not have a personal identification card may bring the purchases to the self-service shopping station, scan the purchases and obtain an itemized receipt of items to be purchased. The customer may pay for the scanned items directly at the self-service scanning station by inserting a credit card into the credit card reader, or may pay at a cashier station. Accordingly, a cashier does not have to individually scan the items being purchased for each customer and may service multiple customer queues.

2 Claims, 2 Drawing Sheets

METHOD FOR SELF SERVICE CHECKOUT

FIELD OF USE

This invention relates generally to electronic, self-service shopping systems. More specifically, this invention relates to a multiplexing tendering station, a self-service scanning station with a bar-code scanner, and associated methods for customer service at a shopping establishment.

BACKGROUND OF THE INVENTION

Computer-assisted shopping systems are well known in the prior art. One example of such a system is described in U.S. Pat. No. 5,468,942 to Oosterveen et al. The Oosterveen '942 Patent describes a system in which an authorized customer is issued a terminal having an integrated bar-code scanner to record merchandise purchases. After items are scanned with the bar-code scanner, the terminal maintains a record of merchandise selected for purchase by the customer within an internal memory. In one application, the record of merchandise is relayed by local area radio and maintained in a computer system. Prior to exiting the store, the information stored in the memory of the scanner is downloaded through a communication port attached to a terminal dispenser, and a ticket of the customer's purchases is printed on a printer. The customer then proceeds to a check-out register where the customer tenders payment for the purchased merchandise. Occasional customers may be audited in order to ensure the integrity of the self-service system.

Related co-assigned U.S. patent application Ser. No. 08/866,690 filed May 30, 1997 discloses a portable shopping and order fulfillment system with enhanced ordering and product data profiles, order collection and order fulfillment. The disclosure of U.S. patent application Ser. No. 08/866,690 is hereby expressly incorporated herein by reference, as are the disclosures of its parent U.S. patent application Ser. No. 08/780,023 filed Dec. 20, 1996 and its grandparent U.S. patent application Ser. No. 08/706,579 filed Sep. 5, 1996.

The prior art computer-assisted shopping systems can enhance and expedite a consumer's shopping experience. However, the prior art systems often require customers to present a security card for identification before using the self-service check-out systems. An example of such a system is a the Personal Shopping System currently marketed by Symbol Technologies, the assignee of the present patent application. This system is a highly efficient method of attracting customers, lowering the shopping establishment's cost and ensuring customer loyalty. It requires a customer to present an identification card in order to obtain a portable scanner, which may then be used to choose, scan and purchase merchandise throughout the shopping establishment. For customers who are unwilling or unable to obtain identification cards, the current Symbol Technologies system incorporates conventional check-out lanes, with each lane served by a cashier. Although Symbol Technologies' current system represents a significant advance for improving efficiency and enhancing the shopping experience, there exist a need for an improved check-out method which will accommodate customers who are unwilling or unable to obtain a personal identification card.

OBJECTS OF THE INVENTION

Thus, it is an object of the present invention to provide an improved method of serving customers who do not have personal identification cards in shopping establishments using computer-assisted shopping systems.

It is a further object of the present invention to provide an improved in-store self-service scanning station to allow customers without an identification card to perform self-scanning of merchandise in a store which operates using automated shopping systems based on portable scanning devices.

It is yet a further object of the present invention to provide a method of minimizing use of conventional check-out lanes so as to allow shopping establishments to reduce costs associated with customer check-out and to promote customer convenience.

It is a further object of the invention to provide an efficient tendering station for receiving payment from customers who use computer-assisted shopping.

SUMMARY OF THE INVENTION

A preferred method of the present invention includes providing portable scanners for use by customers to record items to be purchased as the items are selected, providing a portable scanner station for customers to return the portable scanners and receive itemized lists of the items being purchased and the total price of the items being purchased, and receiving payments for the items at a multiplexing tendering station, whereat a single cashier services multiple customer queues. One of the embodiments of the multiplexing tendering station of the present invention is a dual-lane tendering station, described further, for serving two or more customer queues. In addition, there may be further provided a re-scan station associated with said multiplexing tendering station designated for audit of selected customers.

Another preferred method of the present invention includes: providing a self-service scanning station having a bar-code scanner to allow customers to scan bar codes on items to be purchased right at the self-service scanning station; accumulating data derived from scanning of items by a customer; printing an itemized list of items being purchased and the total price of the items directly at the self-service scanning station; and receiving the total price of the items. According to this preferred method, the shopping establishment can receive payment either directly at the self-service scanning station or at a cashier station, which may be a multiplexing tendering station at which one cashier can service multiple customer queues.

In another aspect of the present invention, a self-service scanning station is provided that includes: a bar-code scanner for scanning and identifying the items to be purchased; a processor coupled to the bar-code scanner for itemizing and totaling the identity and price of the items, and a printer for printing the itemized list. The self-service scanning station can optionally include a scale for weighing items, a bar-code label panel for identifying items being weighed, a packing station for packaging the items by the customer and a cardreader for receiving payment directly at the self-service scanning station.

BRIEF DESCRIPTION OF THE DRAWINGS

The present invention will be understood and appreciated more fully from the following detailed description, taken in conjunction with the drawings, in which.

DETAILED DESCRIPTION OF THE PREFERRED EMBODIMENTS

Figure 1:
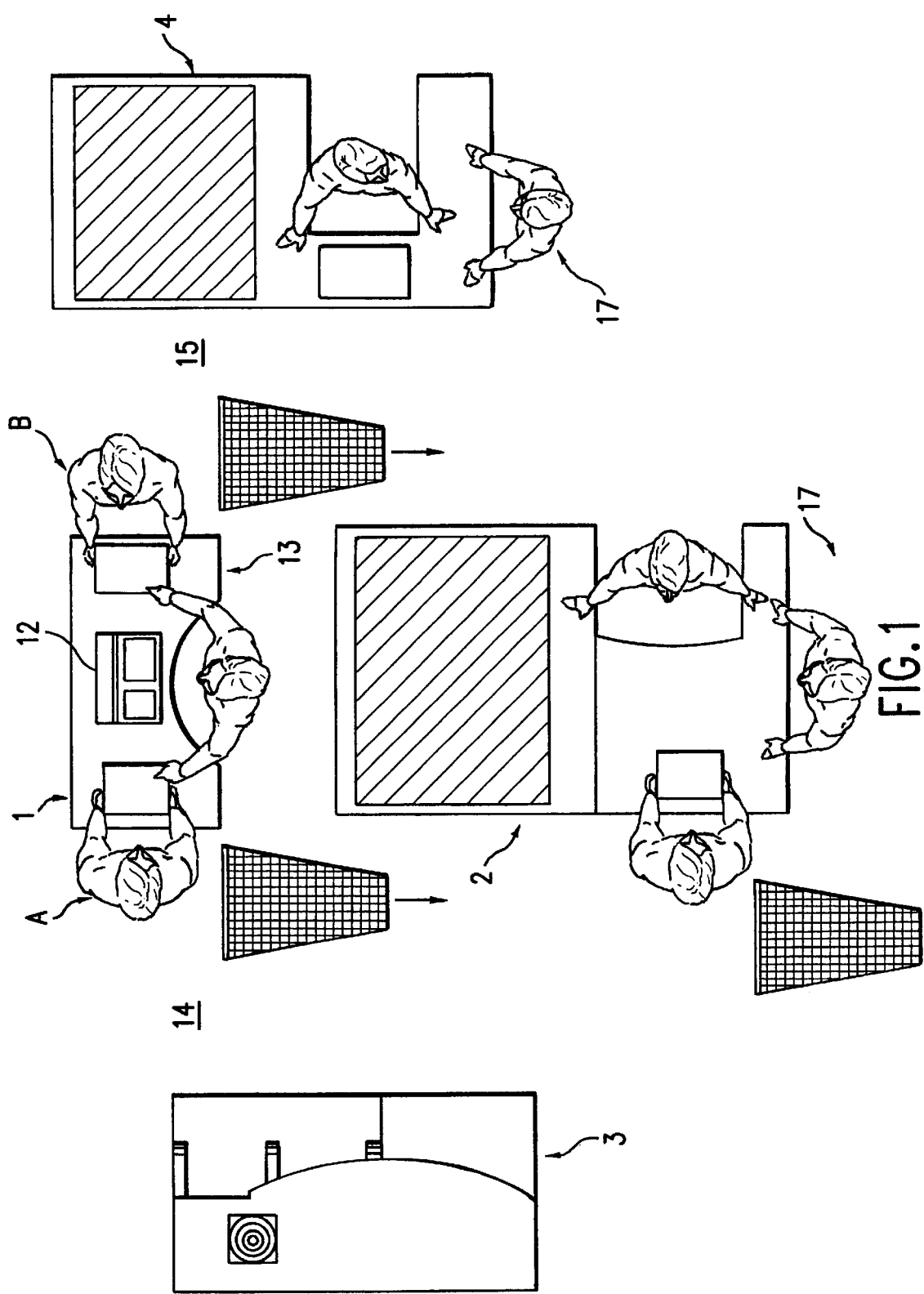
FIG. 1 is a shopping establishment floor plan having check-out counters constructed and arranged for use with the method of the present invention.

FIG. 1 is a shopping establishment floor plan which illustrates a preferred method for serving customers at a shopping establishment in accordance with the present invention.

As shown in FIG. 1, one of the embodiments of the multiplexing tendering station of the present invention is a dual lane tendering station 1, which includes a cash register 12 and a cashier's stand 13 open to two lanes: 14 and 15. A cashier working at the multiplexing tendering station, for example, at the dual lane tendering station 1, may serve the customer A in the lane 14 or the customer B in the lane 15 essentially at the same time. The multiplexing tendering station does not include a traditional scanning lane. A cashier at the multiplexing tendering station of the present invention, including the dual lane tendering station, may be able to service even more than two customers from lanes 14 and 15.

The method, as shown in FIG. 1, allows a shopping establishment to reduce cost by utilizing, for example, the dual lane tendering station 1 at which one cashier can service two or more customer queues. In contrast, a conventional cashier stations allow cashiers to serve only one customer at a time. With conventional cashier stations, a cashier will scan customer's purchases, produce an itemized receipt and receive payment. Thus, the cashier is not able to service more than one customer at a time.

The method of the present invention, however, delegates the tasks of scanning the purchases, itemizing and totaling to the customer, thus leaving only the task of receiving the payment to the cashier. The customer presents the itemized receipt generated at the self-service scanning station described in FIG. 2 or at any other self-scanning terminal, including those currently used in the Symbol Technologies Personal Shopping System, and tenders cash or credit card as payment. Since the cashier's task is limited to receiving payment from customers, the cashier is able to respond to multiple customer queues at the same time. For example, while the customer A in line 14 is signing a credit card receipt, and the customer B in lane 15 is waiting for a credit card receipt to be printed, the cashier is able to greet and receive an itemized purchase list from another customer in lane 14.

Figure 2:
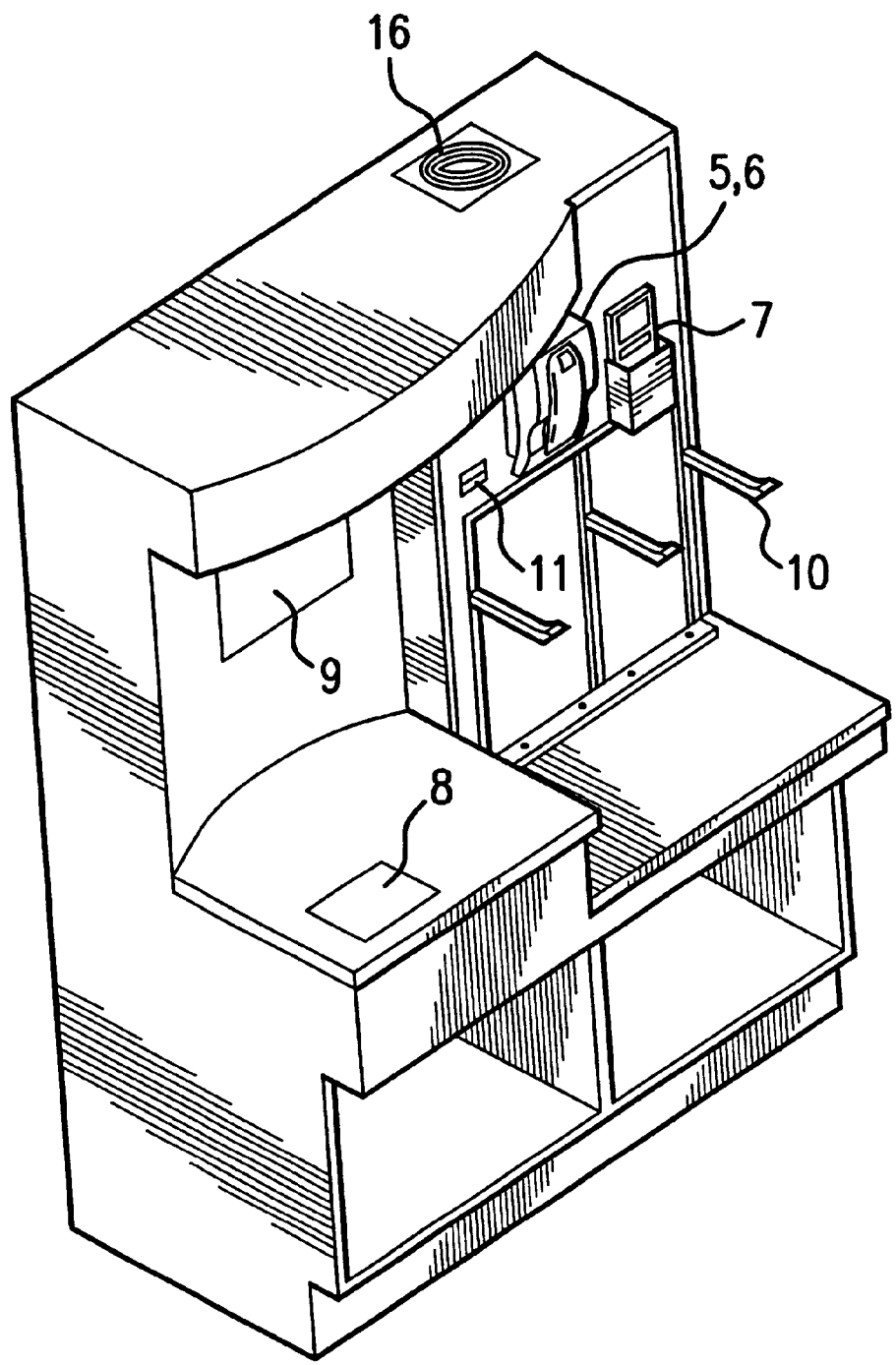
FIG. 2 is a frontal perspective view of an embodiment of the self-service scanning station of the present invention.

Another preferred method of the present invention is directed to minimizing the use of conventional check-outs and reducing shopping establishment cost by providing a self-service scanning station, for example one shown in FIG. 2. Currently, shopping establishments which use the Symbol Technologies' Personal Shopping System combine use of portable scanners, utilized by customers throughout the store, with the use of conventional check-outs. Presently, customers who have a personal identification card can use the card to receive a portable scanner, scan the items to be purchased, return the portable scanners to the portable scanner station, receive an itemized receipt and proceed to the cashier station to pay for the purchases. Customers who, for any reason, do not have personal identification cards must, therefore, shop utilizing conventional check-out methods, i.e., methods wherein a cashier scans each item for a single customer at a cashier station and thereafter receives payment.

According to another aspect of the present invention, there is provided a self-service scanning station, for example one shown in FIG. 2, which is used by customers to scan items to be purchased. A bar-code scanner 5 is permanently mounted, or otherwise secured to a self-service scanning station. To scan items being purchased by a customer using a permanently mounted bar-code scanner with the self-service scanning station, customers will use conventional shopping carts to select and transport the items to be purchased to the self-service scanning station, scan the items at the station and receive an itemized print-out that indicates a total price of the items.

At this point, a customer may choose to pay for the items at the self-service scanning station by inserting a credit card into a card reader, or alternatively proceed to a cashier station and pay for the purchase. If the customer chooses not to pay for the purchase at the self-service scanning station, the customer will either tender cash or a credit card payment at a cashier station, which may be the multiplexing tendering station, for example, at the dual lane tendering station 1, shown in FIG. 1. If the customer chooses to pay for the purchase at the self-service scanning station, the customer may proceed to exit the store.

In both cases, the method of the present invention may include an audit lane 2, shown in FIG. 1, at which the self-scanned purchases of selected customers can be re-scanned. As shown in FIG. 1, a conventional checkout 4 may be placed next to the dual lane tendering station 1 and the re-scan lane 2. This allows the use of a "rover" 17, i.e. a customer service personnel who alternates between the conventional check-out lane 4 and the re-scan lane 2 to pack merchandise as the need arises. A "rover" keeps the re-scan cashier fully occupied.

As further shown in FIG. 1, the self-service scanning station 3 may be optionally placed next to the multiplexing tendering station 1. Alternatively, the self-service scanning station may be placed elsewhere in the store. An advantage of the self-service scanning station of the present invention is in that it allows a shopping establishment to offer the option of computer-assisted shopping to customers who do not have personal identification cards. This includes customers who are in the store for the first time, who are interested in trying out a computer-assisted shopping system, or who are unable or unwilling to obtain a personal identification card for whatever reason.

Referring now to FIG. 2, the self-service scanning station of the present invention has a bar-code scanner 5, a cradle 6 for receiving and re-charging the bar-code scanner, and a printer 7 for printing the itemized list of purchases. The station may also optionally have a scale 8, a bar-code panel 9, a packing station 10, a card reader 11 and vent 16. The arrangement of components of the self-service scanning station of FIG. 2 is shown by way of example and not limitation.

For example, the bar-code scanner 5 may be permanently mounted at the self-service scanning station or, optionally, may be made detachable from the self-service scanning station to allow customers to use the scanner. The bar-code scanner 5 and associated hardware may be any known bar-code scanner, such as the hand-held scanner described in the U.S. Pat. No. 5,468, 942, which is hereby incorporated by reference in its entirety, and which is currently used in Symbol Technologies' Personal Shopping System, or may be a conventional wired or wireless scanner of the type used at checkout stations. The bar-code scanner allows customers to scan and select items to be purchased and to deselect items which the customer no longer wishes to purchase. Further, the bar-code scanner may be permanently tethered or mounted to the body of the self-service scanning station by any means known in the art, for example, by a flexible wire or cord.

When a customer completes scanning of his purchases, which may be detected, for example, by docking the scanner at the self-scanning station, or by any other means, the total price of the items to be purchased is computed and a list is printed by printer 7. The customer may then proceed to a cashier station, such as a multiplexing tendering station 1. The self-scanning station 3 may be connected to a central store computer, for example, the store computer used in the current Symbol Technologies' Personal Shopping System. Further, all self-service scanning stations, cashier stations and the central computer may be connected through a wireless or hard-wired network utilizing any network technology known in the art.

Alternatively, upon obtaining the receipt, the customer may insert a credit card into the optional credit card reader 11, pay the total indicated in the receipt and exit the store, unless selected for audit. The credit card reader 11 may be any credit card reader known in the art. If the customer is selected for audit, the customer bypasses the dual lane tendering station 1 and proceeds to the re-scan lane 4, where the re-scan cashier re-scans the customer's purchases in the conventional check-out manner.

The self-service scanning station 3 may also be optionally equipped with any scale 8 to weigh items which require weighing, and a bar code panel 9, which the customer may use to identify the weighed by the scale 8. After the items to be purchased are brought to the self-service scanning station 3 and weighed, if necessary, the customer may use an optional packing station 10 to place the purchases into plastic or paper bags, and proceed to the dual lane tendering station 1 or exit the shopping establishment.

While there have been described what are believed to be preferred embodiments of the present invention, those skilled in the art will recognize that other changes and modifications may be made thereto without departing from the spirit of the present invention, and it is intended to claim all such changes and modifications as fall within the true scope of the invention.

What is claimed is:

1. A method for customer service at a shopping establishment, comprising:

dispensing portable bar code scanning devices to first customers having established customer identification for user by said first customers to accumulate a list of products being purchased;

providing an unmanned portable device return station whereat said first customers return said scanning devices;

providing an unmanned self-service scanning station for use by second customers who do not have said customer identification, whereat said second customers may scan bar codes on items to purchased to accumulate a list of products being purchased;

providing a cashier station, separate from said portable device return station and said unmanned self-service scanning station, said cashier station being arranged to serve multiple customers at the same time;

receiving payment from said first and second customers for said items on said lists at said cashier station; and a re-scan station separate from said portable device return station, said self-service scanning station and said cashier station, and selecting ones of said first and second customers for re-scan of items being purchased at said re-scan station.

2. A method as specified in claim 1, wherein providing said cashier station comprises providing a cashier station having first and second customer service positions, and wherein said receiving payment comprises providing a single cashier to receive payment from customers at said first and second customer service positions.

* * * * *